March 11, 1952
G. C. A. ALRIC
2,588,904
ARTILLERY TRAINING DEVICE
Filed July 26, 1947
11 Sheets-Sheet 4
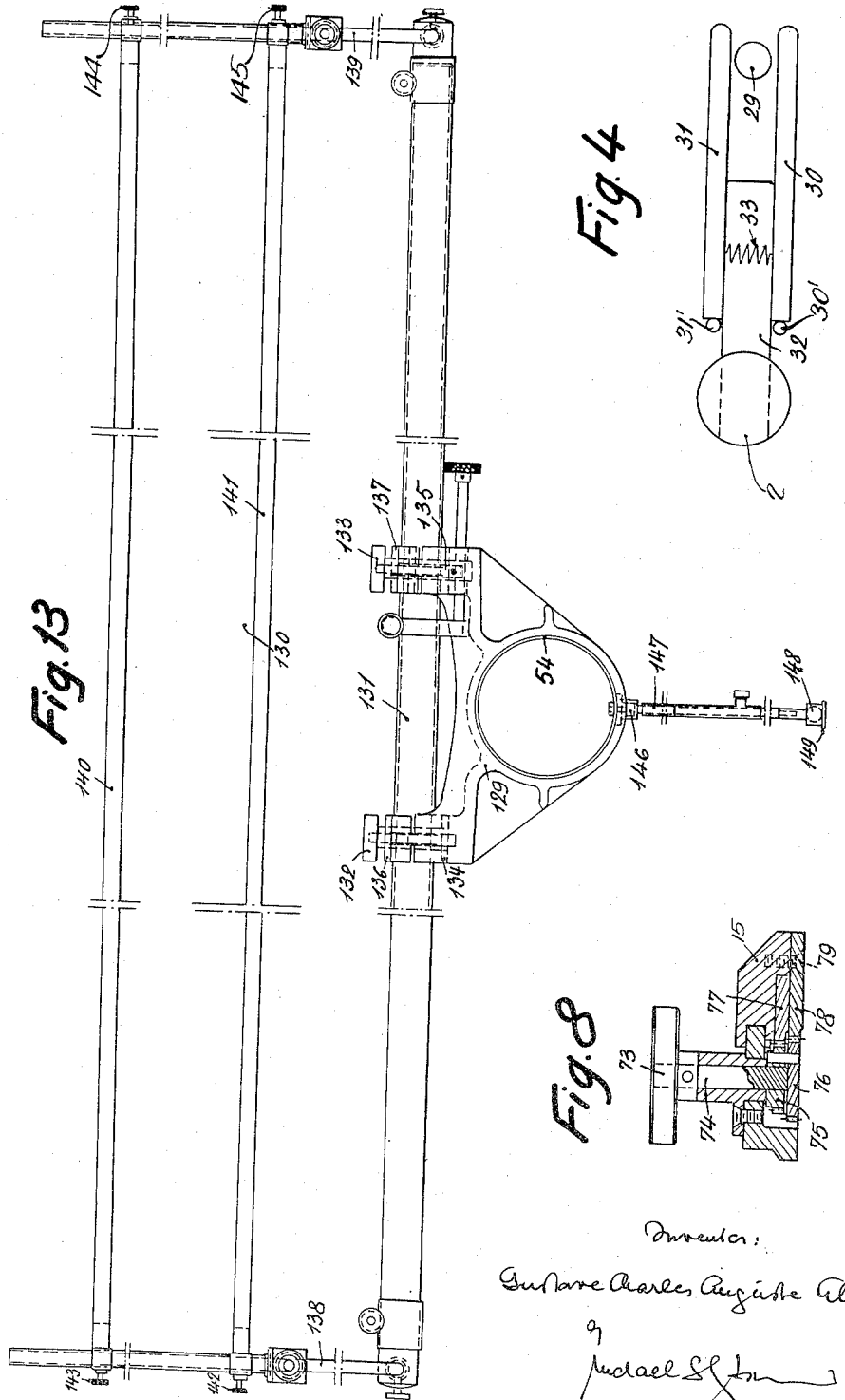

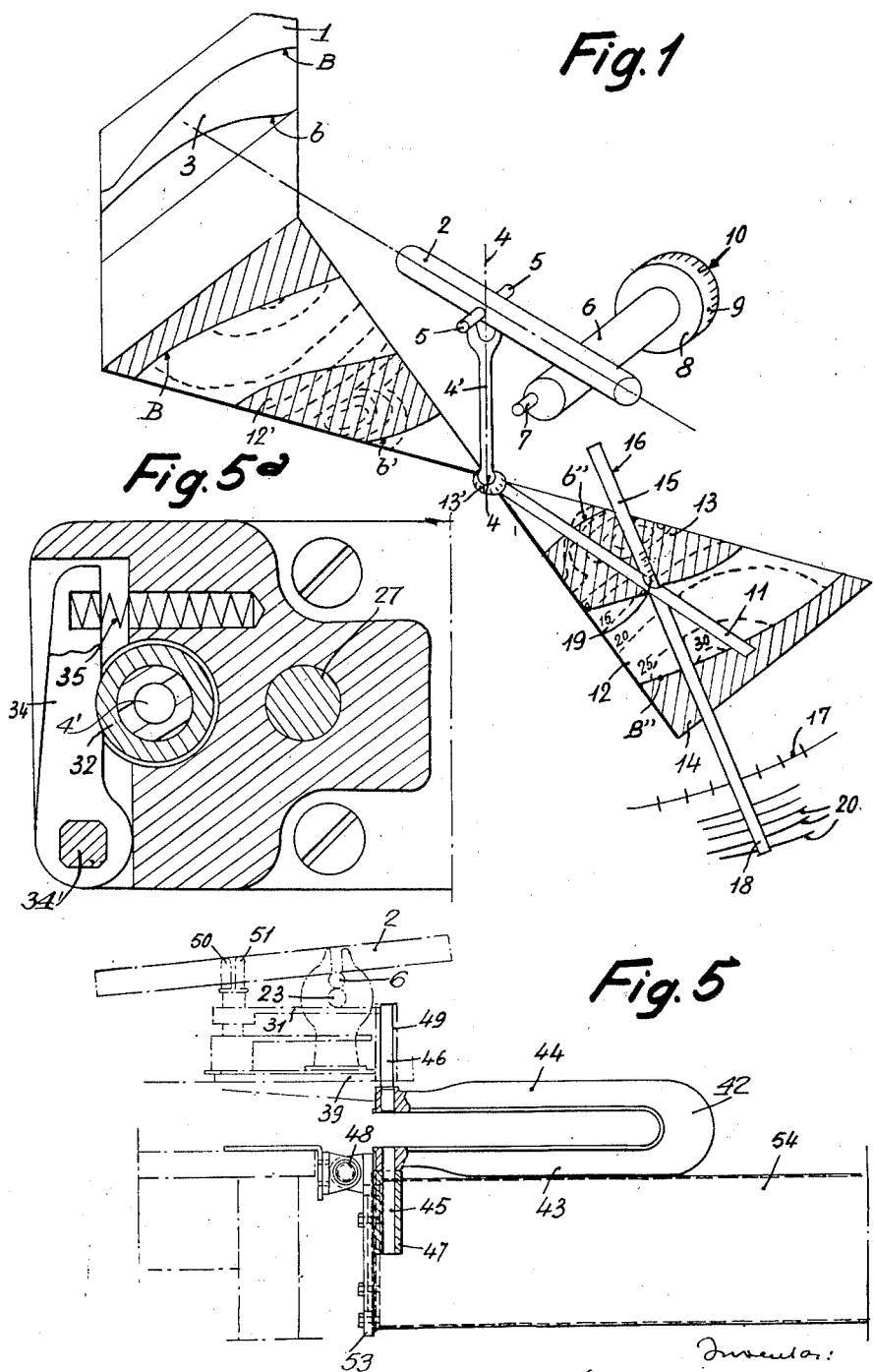

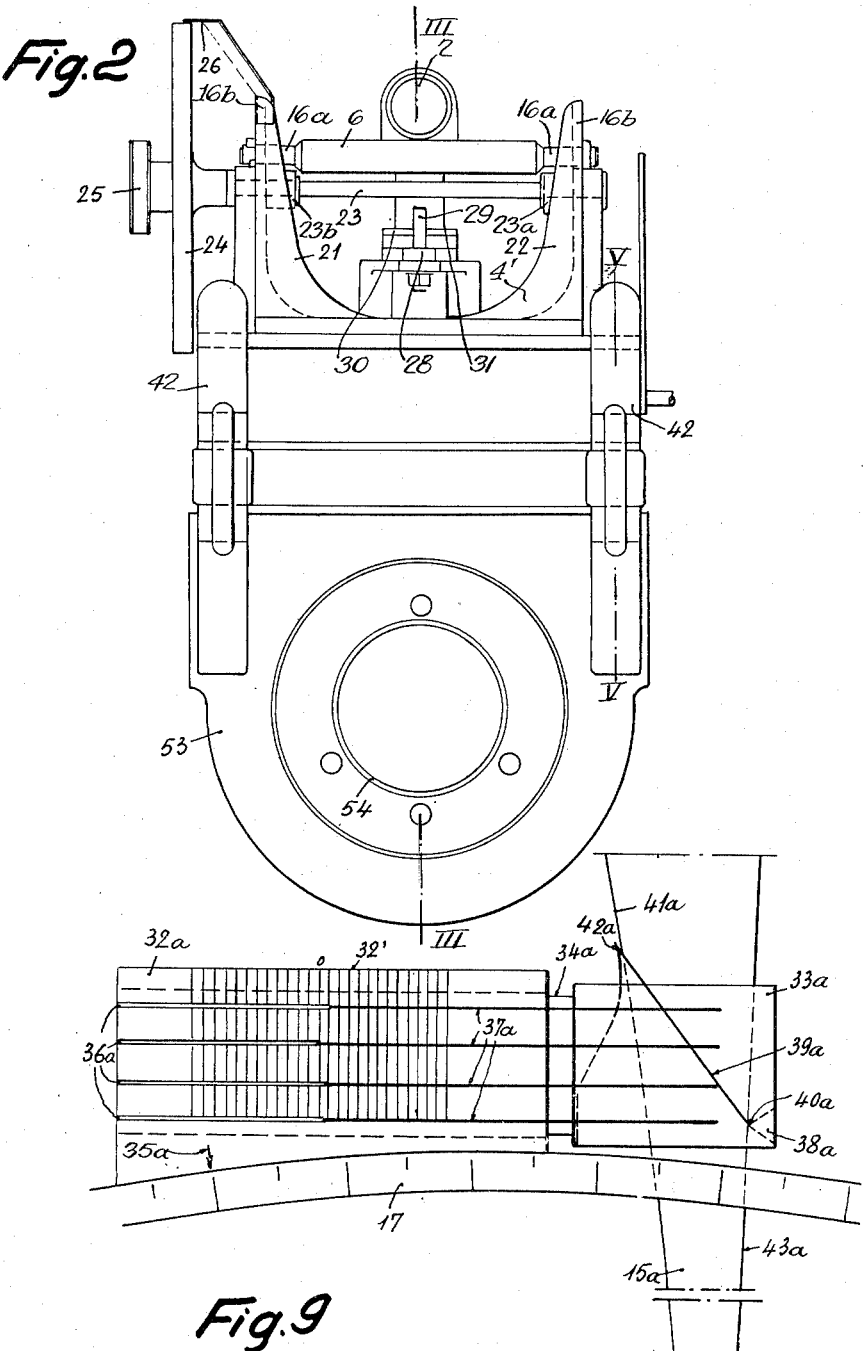

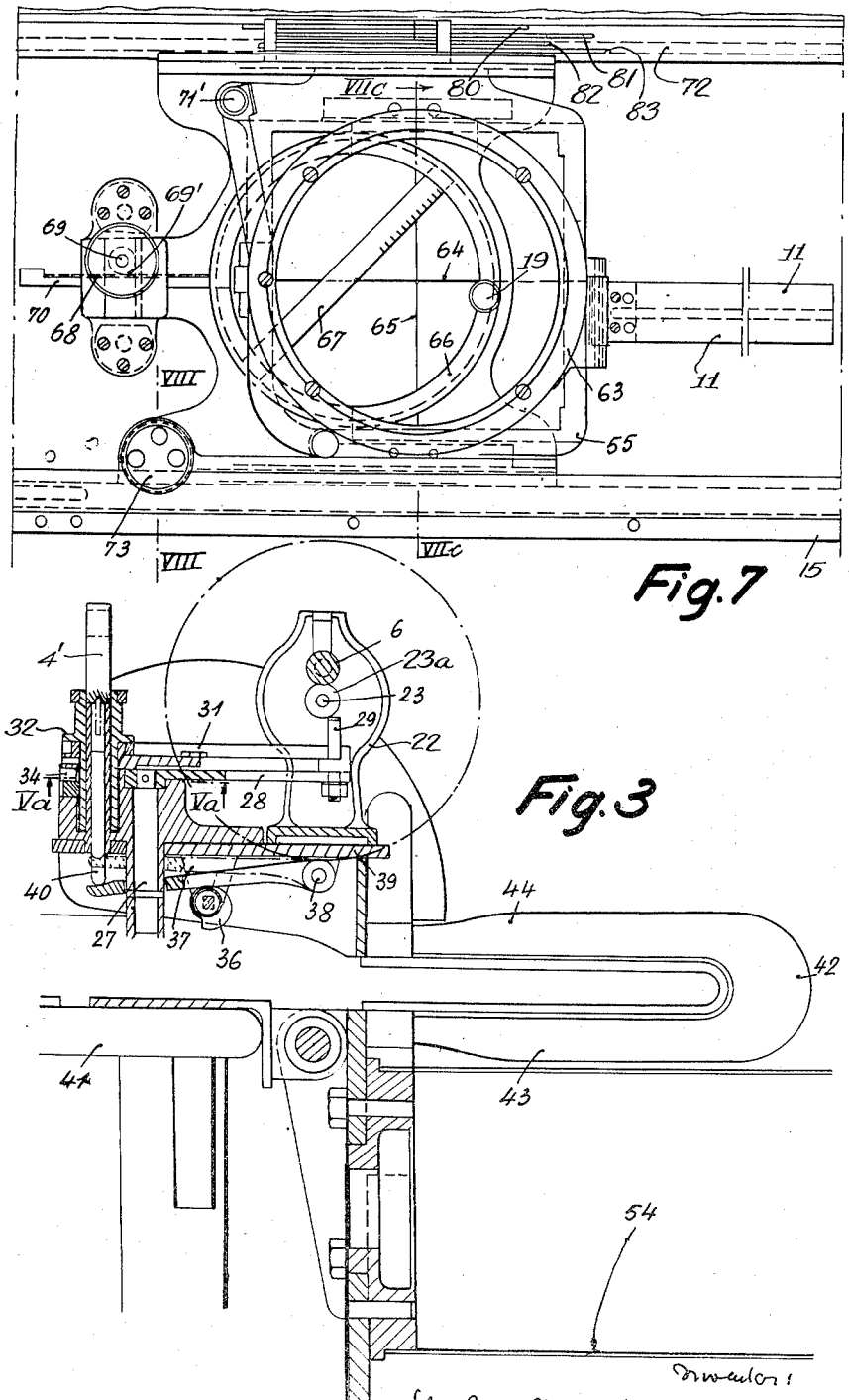

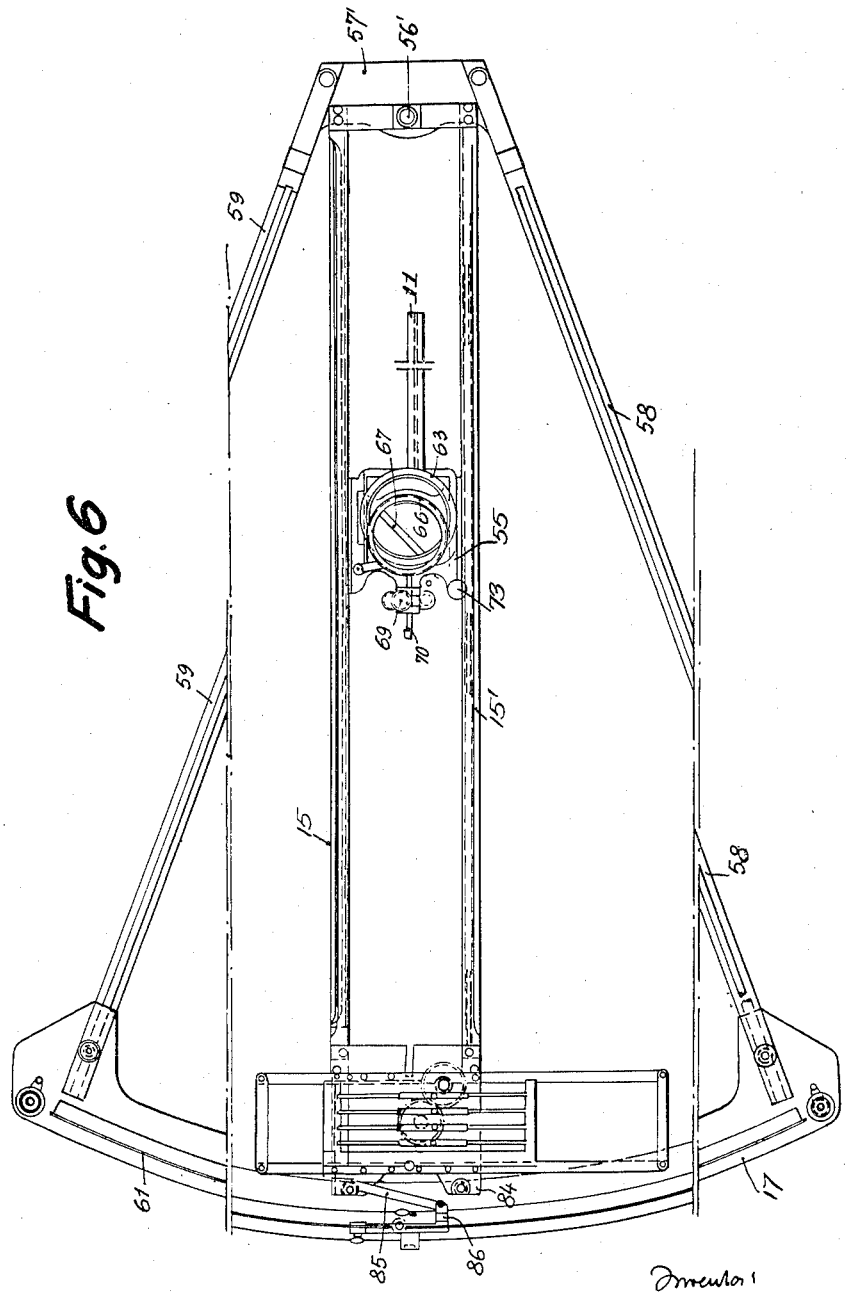

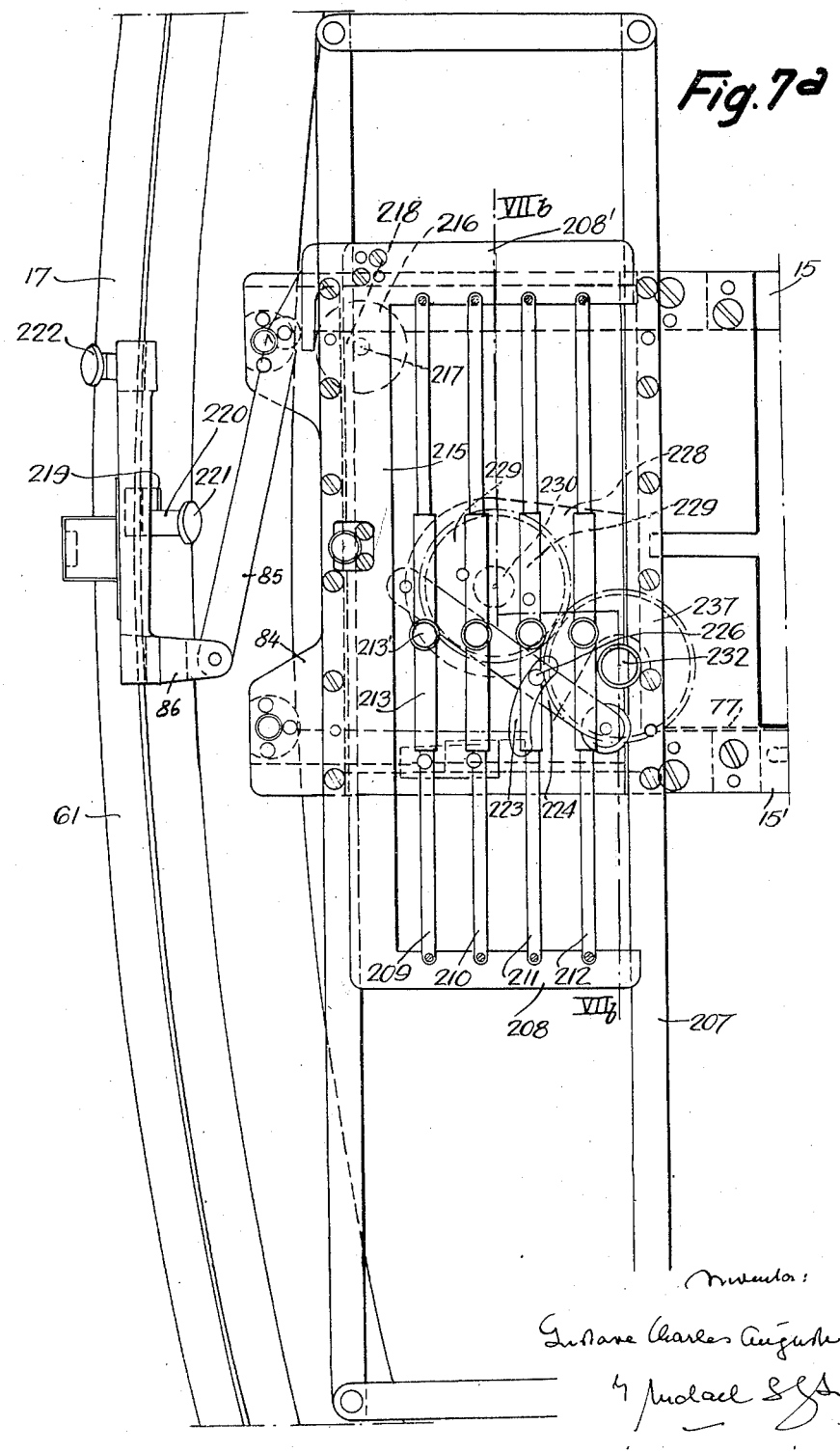

March 11, 1952   G. C. A. ALRIC   2,588,904
ARTILLERY TRAINING DEVICE
Filed July 26, 1947

March 11, 1952  G. C. A. ALRIC  2,588,904
ARTILLERY TRAINING DEVICE
Filed July 26, 1947  11 Sheets-Sheet 8

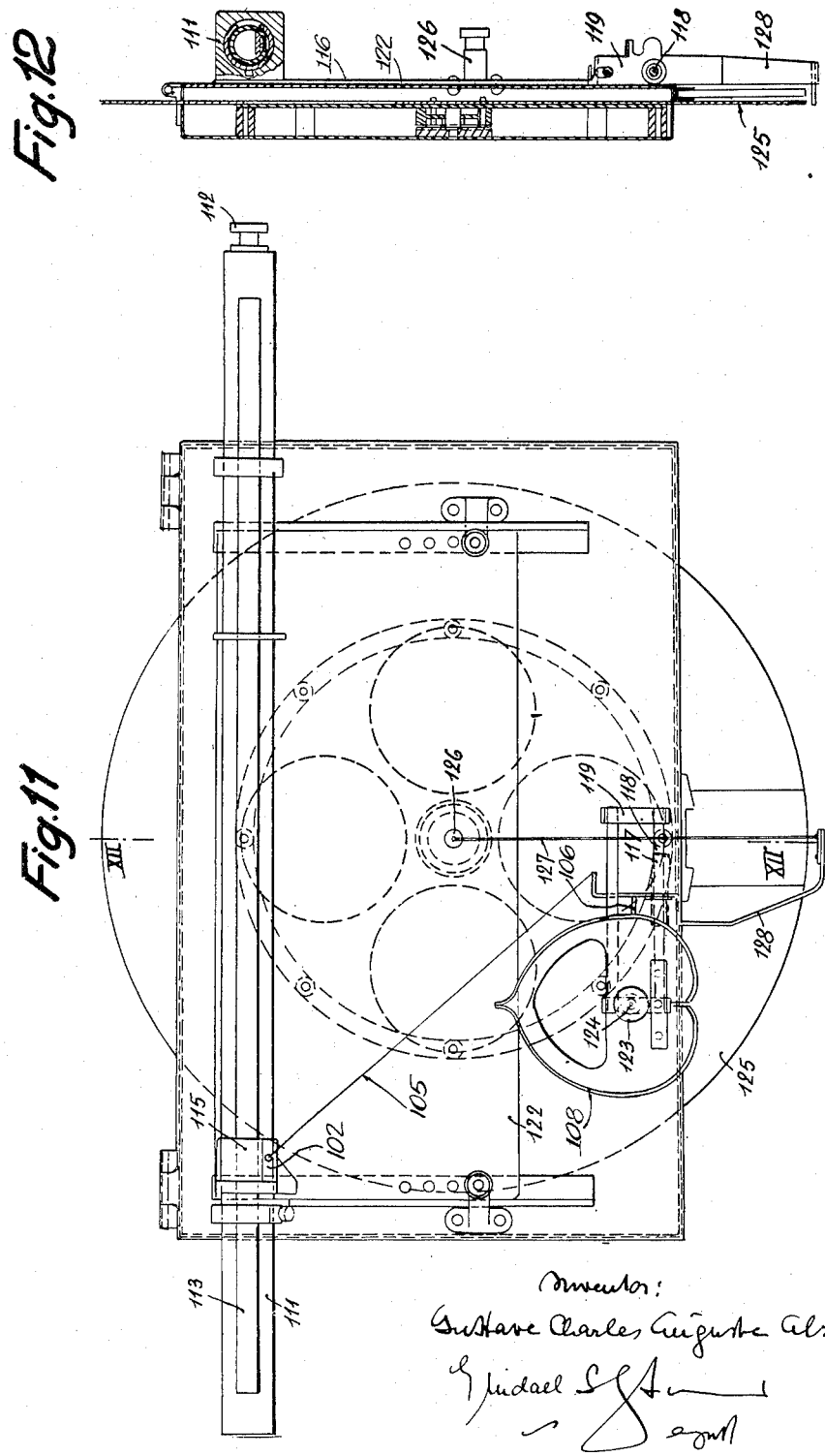

March 11, 1952  G. C. A. ALRIC  2,588,904
ARTILLERY TRAINING DEVICE
Filed July 26, 1947  11 Sheets-Sheet 10

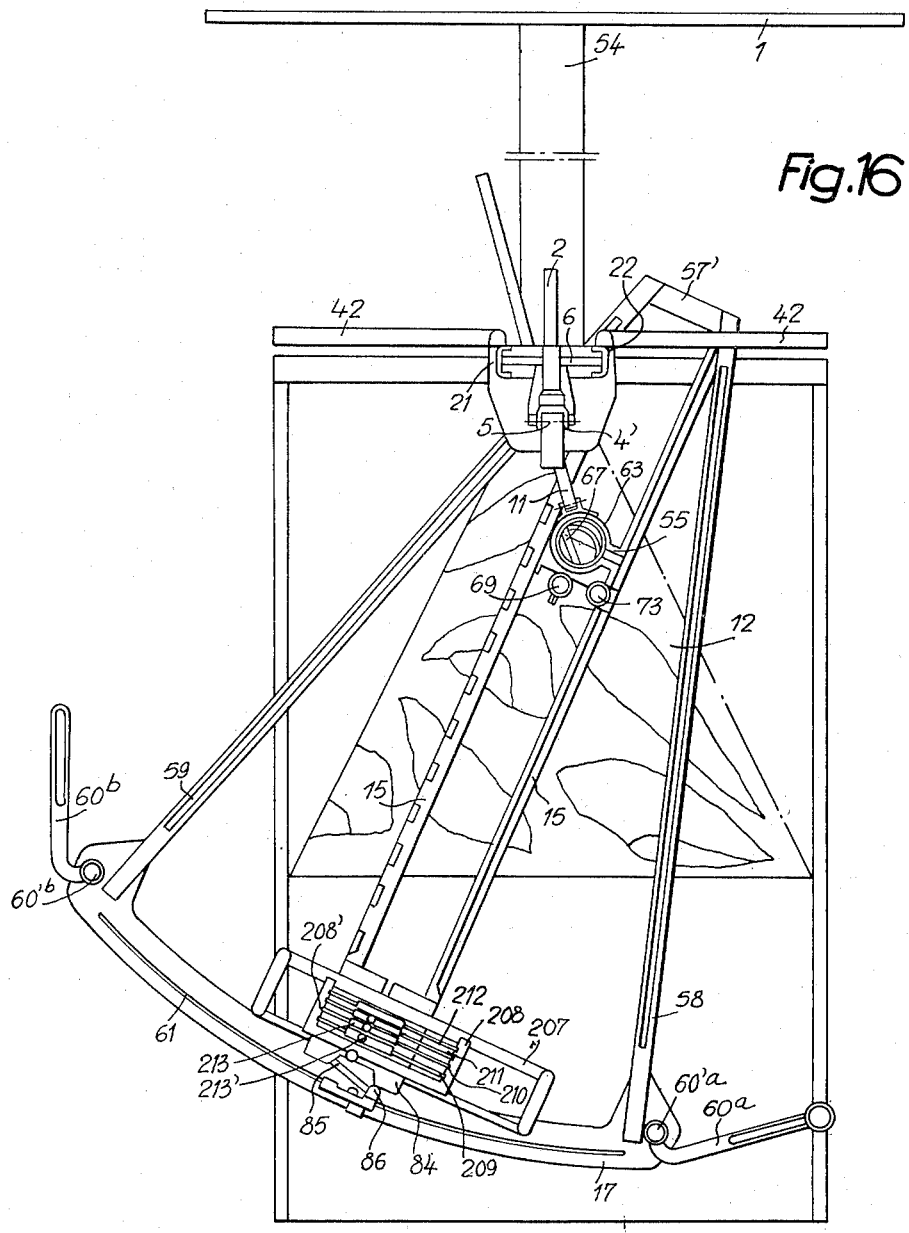

Patented Mar. 11, 1952

2,588,904

UNITED STATES PATENT OFFICE 2,588,904

ARTILLERY TRAINING DEVICE

Gustave Charles Auguste Alric, Troyes, France

Application July 26, 1947, Serial No. 763,970
In France February 9, 1940

8 Claims. (Cl. 35—25)

1

The present invention relates to an apparatus for the training of gunners in which an optical projector representing a piece of artillery throws a spot of light on a vertical screen.

It is an object of the present invention to provide an apparatus of the kind described which is easily portable and inexpensive to manufacture.

It is another object of the present invention to provide an apparatus of the kind described which takes into account all the factors determining the actual shooting, such as variations due to scattering.

It is a further object of the present invention to increase the speed of operation of the apparatus so as to indicate the fire of a battery firing at a normal rate.

It is still another object of the present invention to provide an apparatus of the kind described which permits to imitate time fuse shrapnel fire or air-burst high explosives as well as percussion rounds.

It is a still further object of the present invention to provide an apparatus of the kind described which enables all the persons handling the apparatus to have the same view even if they are not placed at the spot where the observer is who gives the commands for laying the gun.

Other objects of the present invention will become apparent from the following detailed description and the drawings attached hereto, in which Fig. 1 is a perspective view of a simplified device intended for an explanation of the principles of the present invention;

Figs. 2 to 9, 11 to 13, and 16 are detailed views of a practical embodiment of the present invention, and more particularly Fig. 2 is a front elevation of the support of the projector;

Fig. 3 is a side elevation, partly in cross-section along line III—III of Fig. 2, of the projector support shown in Fig. 2;

Fig. 4 is a plan view of the guiding device of the projector at an enlarged scale;

Fig. 5 is a side elevation of the projector support, partly in cross-section along line V—V of Fig. 2, Fig. 5 being at a slightly reduced scale in comparison to Fig. 3;

Fig. 5a is a cross-section taken along the line drawn in Va—Va in Fig. 3 at a much enlarged scale;

Fig. 6 is a plan view of the device for guiding the projector in a horizontal plane;

2

Figure 7B:
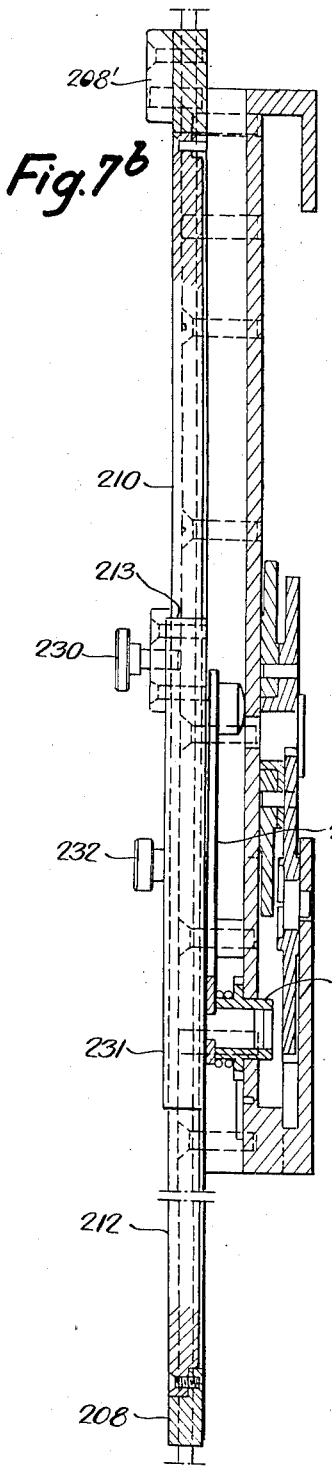
Figs. 7 and 7a are detailed plan views of parts of Fig. 6 at an enlarged scale.
Figure 7C:
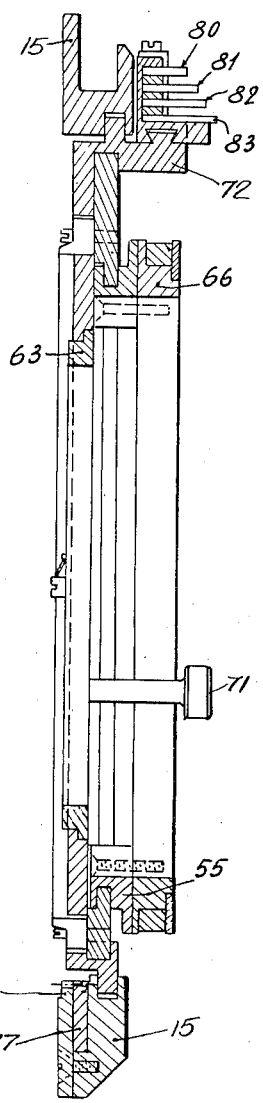
Figure 10:
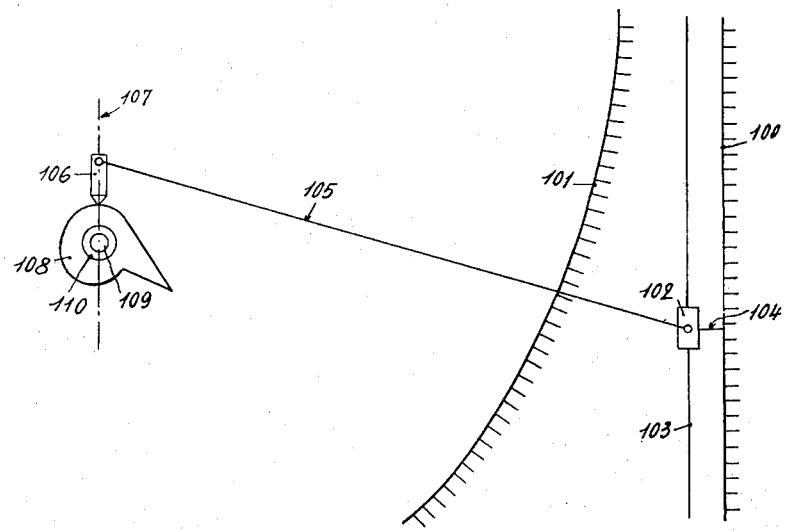
Figure 15:
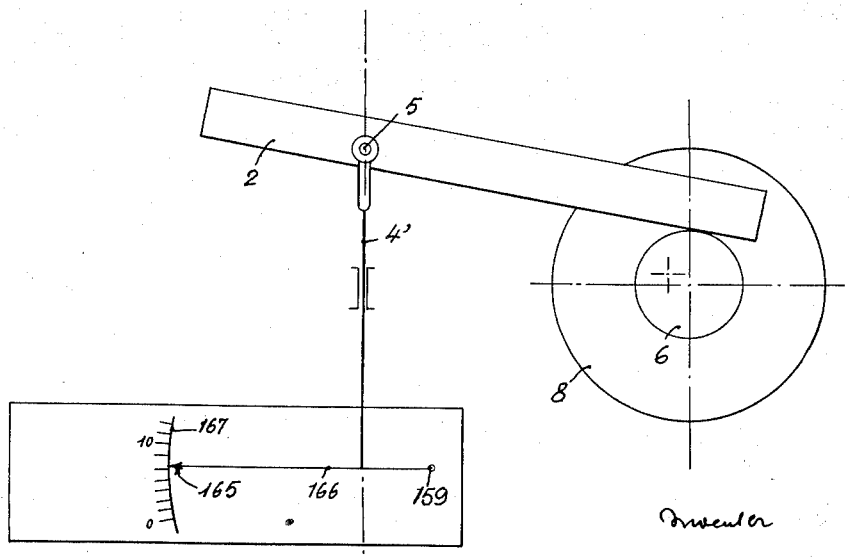
Figure 14:
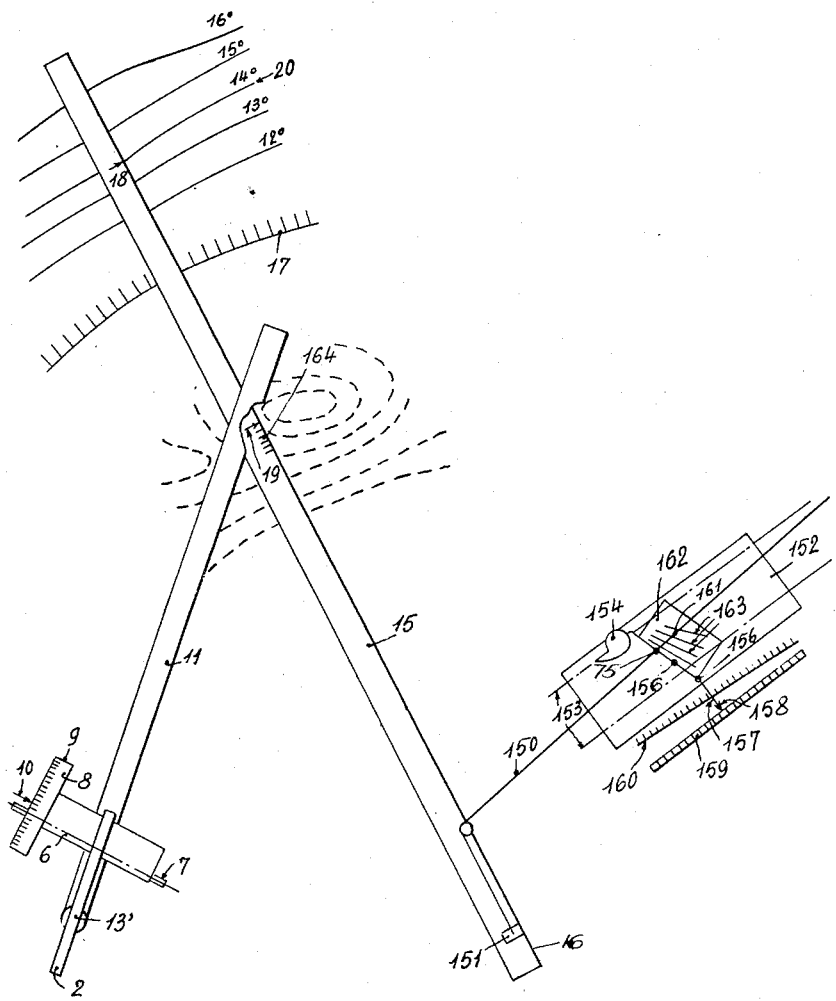

Fig. 7b is a cross-section along the line VIIb—VIIb of Fig. 7a;

Fig. 7c is a cross-section along the line VIIc—VIIc of Fig. 7;

Fig. 8 is a cross-section along the line VIII—VIII of Fig. 7;

Fig. 9 is a partial plan view of the device when used for battery fire;

Fig. 10 is a diagrammatic side elevation of the device used for determining the desired trajectory;

Fig. 11 is a side elevation of a practical embodiment of a device for determining the desired trajectory;

Fig. 12 is a cross-section along the line XII—XII of Fig. 11;

Fig. 13 is a front elevation of the holding device for the landscape screen;

Fig. 14 is a diagrammatic plan view of the device when used for air-bursts;

Fig. 15 is a diagrammatic side elevation of the device when used for air-bursts; and Fig. 16 is a plan view of the entire device according to the invention at a slightly reduced scale.

Referring now to the drawings and first to Fig. 1, I is a screen bearing a perspective view of the field of fire as seen from an observer's position and showing topographical features such as roads, houses, woods and the like. Of the contours only the visible outlines of the crests are shown, comprising in the example illustrated two hill crests B and b also reproduced on the horizontal map 12. The contour data are supplemented by a map 12 which will be discussed more in detail hereinafter.

A projector 2 throws a light spot on the screen 1 indicating the point of impact 3 of the shell on the lanscape represented on the screen 1. The projector 2 is mounted on a support 4' in which it can swing about a horizotal axis 5—5, the support 4' being rotatable about a vertical axis 4—4. The rear end of the projector 2 rests upon a cylinder 6 which rotates eccentrically about an axis 7. The cylinder 6 carries a drum 8 bearing a graduation 9 moving along a stationary indicator or mark 10. This drum is, however, not essential as the part played by it may be played by a scale carried by the means controlling the rotation of the cylinder 6. The horizontal axis 5—5 is arranged in front of the center of gravity of the projector 2, so that the rear end of the latter always rests on the eccentric cylinder 6. An arm 11 is rigidly secured to the support 4' and rotates with the same. The arm 11 moves over a map 12 which corresponds to the area of the field of fire shown on the screen 1, seen from a given observation post. The map 12 has a set of curves 30, 25, 20, etc., connecting points of equal sight as measured from the observation post which is given by the intersection of the vertical axis 4—4 of the support with the map 12 and is denoted by the reference numeral 13'. Logically the map ought to be in a position indicated at 12' between the observation post 13' and the screen 1. However, for the sake of convenience of operation of the device the map is transferred to the position shown at 12. On the map 12 are lines such as B" and b" as corresponding respectively to the crests B and b on the landscape screen 1. The zones hidden from view by the crests B and b are hatched on the map 12 as indicated at 13 and 14.

The device further comprises a calibrated control slide 15 having straight edges which can swing horizontally about a point 16 in the plane of the map 12 representing the gun platform. The slide 15 is arranged for a longitudinal sliding motion of a carriage system to be more fully described hereinafter and crosses a circular member 17 bearing a graduation indicating the bearing or direction in which the gun is laid. The slide 15 is provided with two marks 18, 19 the first of which can be brought into coincidence with any one of the series of equitrajectorial curves 20' which represent several trajectories obtained from the fire order (elevation, charge and the like) corresponding to the selected battery position as explained more in detail hereinafter. These trajectories are drawn so as to take into account modifications of the range due to obstacles and features of the ground. The other mark 19 is intended for adjusting purposes as will be disclosed hereinafter.

Referring now to Figs. 2 and 3, the projector 2 rests on a cylinder 6, the ends 16a of which are slidably arranged in vertical slots 16b in the sides 21, 22, respectively, of the projector support 4'. The height of the projector 2 is determined so as to take into account the distance from the target.

To give the necessary height to the cylinder 6, the ends 16a rest on eccentric cams 23a, 23b, arranged at the ends, respectively, of a shaft 23 arranged parallel to the cylinder 6. The shaft 23 is rotatably ararnged in the sides 21, 22 of the support 4'. A knob 25 is secured to the shaft 23 for rotating same and adjusting the cams 23a and 23b. If the graduation on the drum 8 corresponding to the predetermined distance is brought opposite to the index 10, through action on the knob 25, the projector 2 points automatically in the desired direction in a vertical plane.

The swinging of the front end of the projector 2 in a horizontal plane according to the fire orders is effected by the arm 11 (Fig. 1) which will be described more fully hereinafter and rotates an axle 27 shown in Fig. 3. The latter causes the swinging of a rod 28 carrying a gudgeon 29 which is preferably integral with the rod 28 and arranged between two rods 30 and 31 (Fig. 4), which are connected to the legs 30' and 31' of a fork which are arranged on either side of a part 32 integral with the projector 2. The rods 30 and 31 are pulled toward each other by a tension spring 33. According to the movement of the arm 11, the gudgeon 29 moves either the rod 30 or the rod 31. A locking member 34 pivoted at 34' is urged by a tension spring 35 towards the part 32 so that in the normal position thereof the latter is locked (Fig. 5a). When required the operator urges manually the locking member 34 away from the part 32 against the action of the spring 35 so that said part 32 is free to swing with the projector 2 towards that rod 30 or 31 that is moved by the gudgeon 29. The projector thus being properly set, the operator closes the circuit illuminating the bulb in the projector 2 as to to throw a spotlight onto the landscape screen 1 to show the point of impact of the shot.

If the apparatus is used for an imitation of a burst shot, the projector 2 is given a greater elevation then for a percussion shot made at the same distance. The sighting device is moved by means of a cam system shown in Fig. 3. On a cam 36 rest a lever 37 which is linked at 38 to the support 39 of the sighting device. At the other end the lever 37 carries a push rod 40, the upper part of which is in contact with the support 4' of the projector. The cam 36 is turned so as to make an angle corresponding to the desired height of burst as will be described more in detail hereinafter.

The projector supporting device is preferably fixed to a table 41 by means of two stirrups 42 which are disposed symmetrically (Figs. 2, 3, 5). The lower leg 43 of each stirrup is linked by a pivot 48 to the table 41, whereas the upper leg 44 of each stirrup is linked to the support 39. This arrangement gives a greater space for operating the arm 11 rigidly connected to the support 4' which controls the rotation of the axle 27 and which can move between the legs 43 and 44 of the stirrups 42. As shown in Fig. 5, the lower leg 43 is made integral with an axle 45 arranged in a tubular sleeve 47 connected to the pivot 48. The upper leg 44 is made integral with an axle 46 arranged in a tubular sleeve 49 made integral with the support 39.

Preferably, each of the rods 30 and 31 is provided with two ears such as 50 and 51, placed, respectively, on each side of the projector 2 (Fig. 5).

The electric wiring of the projector 2 is not described in detail, it being understood that it comprises an ordinary light bulb fed with current in a known manner and provided with a switch arranged in the current supply thereof. The projector 2 is provided at its front face with a screen which allows only a narrow beam of light to pass.

As shown in Figs. 2 and 5, the sleeves 47 are made integral at their lower part with a ring 53 surrounding a tube 54 of fairly large diameter, on the end of which a support for the drawing representing the landscape of the field of fire is fixed as will be described more fully hereinafter. The tube 54 is shown also in Figs. 3 and 5.

The movements of the projector in a horizontal plane are controlled by means of a device shown in Figs. 6 and 16, illustrating the assembly of the aiming device. This device comprises a slider or carriage 55 which moves between parallel rails forming the slider 15 as in Fig. 1. The rails 15 are rotatable as a whole about an axle 56' which is made integral with a platform 57' constituting the end of a frame comprising two beams 58 and 59 and a circular member 17 bearing a scale graduated in angles of direction of the battery. Said member is provided with lateral handles 60a and 60b pivotally secured thereto at 60'a and 60'b. The arm 11 which controls the movement of the projector 2 in a horizontal plane slides with its free end in a slide integral with the axle 27 (Fig. 3) so as to make the axle 27 rotate about its axis.

The map 12 shown in Fig. 1 is placed underneath the carriage 55, as shown in Fig. 16.

As shown more in detail in Fig. 7, the arm 11 is integral with a ring 63 bearing two diameter threads 64, 65 crossing each other at right angles at the center of the ring in order to allow an exact determination of the point of impact.

The ring 63 moves below and cross a ring 66 which is provided with a graduated straight ruler 67 arranged substantially along a diameter of the ring 66. As will be seen from Fig. 7, the threads 64 and 65 of ring 63 pass over the graduations of the ruler 67. The angle made by the ruler 67 with the thread 64 is determined by a chart taking into account the data of the trajectory (charge, distance, etc.) and also the distance from the observation post.

A control knob 68 is fixed on an axle 69 carrying a pinion 69′ engaging a rack 70 moving the ring 63 and the threads 64, 65.

Furthermore, a knob 71 which is also shown in Fig. 7c allows a supplementary movement of the ring 63 which is used when the apparatus is to imitate air bursts.

According to Figures 7a and 7b, the device for shooting with the battery consists of two parts 207 and 208. The part 208 is slidably arranged on the part 207 and designed as a carriage which accommodates four rods 209, 210, 211, and 212 of rectangular cross section, which are fixed with their ends on the cross members 208 and 208′. Each of the rods corresponds to one of the four pieces of the battery. On each is slidable a cursor such as 213, which is provided with a maneuvering knob 213′ and carries on one of its ends an index (not shown). The rods 209, 210, 211, and 212 carry a division which corresponds to an identical division which is arranged on the lateral piece 215 of the carriage 208. The whole carriage is slidably arranged on the fixed frame 207 and is shifted by means of a knob 216 with which a toothed wheel 217 is rigidly connected. A rack 218 rigidly connected to the frame 207 engages the toothed wheel 217. On the other hand, as previously indicated, the frame 207 is connected by the rod 85 with the carriage 86 which is displaceable along a scale 17 and carries an index 219 connected to the cursor 220 which can be immobilized through a screw 221 on any point of the small scale shown on the carriage 86. The carriage can equally be immobilized through the screw 222 at any point of the scale 17. Under the carriage 208 is arranged a connecting member 223 which carries a longitudinal member 224 and is pivotally arranged about a pin 225 which is rigidly connected to the frame 207. Under the member 223 is fixed a projection 226 through which it abuts under the influence of a spring 227 wound about the pin 225 permanently against the circumference of a cam 228 the profile of which corresponds to the scattering of the pieces of the battery as a function of the range. The cam 228 is rigidly secured to the toothed wheel 229 which turns about an axis 230 rigidly secured to the frame 207. The toothed wheel 229 engages a second toothed wheel 231 which turns about the axis 232 and engages the rack 77 which is fixed on one of the rails 15 (see Figure 8). The latter, as is explained hereinafter, is displaced differentially by a knob 73. This knob causes by means of the rack 77 the motion of the toothed wheels 231, 229 and the cam 228, the displacement of the projection 226 of the member 223 in the slot 233 which is provided in the plate 84. The inclination of the member 223 is therefore adjustable as a function of the range which is determined by means of the knob 73 as previously described. After the carriage 208 has been placed in position for the shooting direction, the knob 73 determines the position of the member 223 in which the indices of the four cursors 213 corresponding to the four pieces of the battery are aligned in order to take account of the parallax and the staggering of the pieces.

Thus it is seen that the carriage assembly 55 moves along the rails 15 one of which carries on the upper surface thereof a scale graduated in topographical distances. Furthermore, the carriage assembly 55 can be moved by the rotation of the knob 73 which, as shown in Fig. 8, is rigidly connected to a shaft 74 carrying two pinions 75, 76 having different diameters. The pinion 75 engages a rack 77 provided movably underneath the corresponding rail 15, and the pinion 76 engages a rack 78 made integral with the last mentioned rail by means of screws such as 79. By this structure it is accomplished that a rotation of the knob 73 moves the carriage 55 and the rack 77 simultaneously for a purpose to be more fully explained hereinafter.

The person moving this sighting device sets a mark on the carriage 55 to a position opposite the division indicating the topographical distance given to him by another person using an auxiliary device which will be more fully described hereinafter.

Four slides 80, 81, 82, 83 (Fig. 7c) are arranged under the carriage 55, each of which corresponds, respectively, to one of the guns of a battery having four pieces. The slides 80 to 83 protrude over the carriage 55 by staggering amounts corresponding to the respective topographical distances of the guns. When the order for a battery fire is given, the operator sets the ends of each slide, one at a time, opposite the mark indicating the distance given to him.

At the end opposite to the platform 57′ the rails 15 are connected with each other by a plate 84 (Figs. 6, 7, 8, 16) which is pivotally connected to one end of a rod 85, the other end of which is pivoted to a carriage 86 moving along the circular scale 17. A mark on the carriage 86 is set opposite the division of the scale 17 which indicates the direction of the battery fire.

The apparatus may be used to imitate a battery fire with different directions for each gun so as to take into account the spacing of the guns transversely to the line of fire and also the spacing thereof in echelon. For this purpose, the device shown in Fig. 9 is used which comprises two parts 32a and 33a which are shown in Fig. 9 as arranged outside the circular scale 17. It should be understood, however, that the question whether this device is to be arranged outside or inside the scale 17 depends on the length of the supporting table or of the maps. Part 33a slides along a guiding member 34a rigidly connected to the part 32a which is provided with an indicator 35a moving along the scale 17. Furthermore, the part 32a is provided with four straight slots or grooves 36a in which four straight slides 37a are movable which correspond, respectively, to the individual guns of a battery of four guns. The position of the slides 37a can be adjusted with the aid of a scale 32′ provided on the upper face of the part 32a. The part 33a is provided with a stop 38a and a member 39a having a straight edge which can swing about a pivot 40a. The other end of the member 39a is permanently urged against the edge 41a of the slide 15a by means of a spring 42a which also urges the stop 38a against the edge 43a of the slide 15a.

In order to obtain the imitation of the arrival of a shell from a given gun the following steps are carried out:

The indicator 35a is first set to coincide with the division of the scale 17 indicating the given direction. Then the trajectory is determined by means of the device shown in Fig. 1 and the index 18 is set on the determined trajectory as more fully explained hereinabove. Then the part 33a is made to slide on part 32a without moving the latter so that the member 39a is set to a position in which it touches the end of the particular slide 37a corresponding to a particular gun (in the example shown in Fig. 9 the gun No. 2). The slide 15 is shifted lengthwise in order to correct the position of the index 18 as required. The procedure then continues as explained hereinbefore, that is, the equi-sight contour is read against the index 19, the corresponding reading on scale 9 is set to coincide with mark 10, the arm 11 is set on the mark 19, and the illumination of the projector 2 is switched on (Fig. 1). The luminous spot thrown by the projector 2 on the screen 1 indicates the arrival of a shell from the respective gun in accordance with the fire orders.

If it is desired to imitate the shooting on parallel lines, the slides 37a are set to the zero division of the scale 32'. If the fire of guns being in echelon has to be imitated, the slides 37a are set to the corresponding readings on the scale 32'.

The edge 41a of the slide 15 is shaped so as to allow for the effect on the range of the apparent spacing of the shots by changing the angle of slope of the member 39a. The speed of manipulation of the apparatus is sufficient for imitating a battery fire carried out at normal rates.

A device for selecting the trajectory determined by the fire order such as charge, shell, etc., and more especially for making allowance for variations in a range due to scattering is shown diagrammatically in Fig. 10. The device comprises a straight scale 100 graduated in angles of elevation from the horizontal or in angles of side end elevation and a curved scale 101 from which the required trajectory can be read. It is to be understood that any individual scales 100 and 101 are valid only for one charge and one type of shell. A cursor 102 slides along a guiding member 103 arranged parallel to the scale 100 and is provided with an indicator 104 moving along the straight scale 100. The cursor 102 is connected by a thread 105 preferably consisting of rubber, to a feeler 106 which is vertically movable in the direction of the axis 107 thereof and the point 106' of which can be lowered onto a cam 108 which is made to spin about the axis 109 thereof by means of a knob 110. The profile of the cam 108 is shaped in such a manner that it corresponds to the probability of deviations of the range from the set value. The surface of the cam 108 is preferably roughened in order to avoid an inadvertent rotation of the cam 108 by the feeler 106.

The operation of this device is as follows:

The indicator 104 of the slide 102 is set to coincide with the division of the scale 100 which corresponds to the given elevation from the horizontal. The cam 108 is then made to spin by means of the knob 110 while the feeler 106 is lifted so that the cam 108 can spin freely. When the cam 108 stops spinning, the feeler 106 is lowered into contact with the cam 108 which stops in a random position so that the profile thereof insures that the position of the feeler 106 is governed by the same probability laws as those governing the differences in range from the set value in actual firing practice. Thus, it is seen that the trajectory given by the point of interseption of the thread 105 and the scale 101 corresponds to the correct "fall of shot" pattern.

The index 18 of the slide is then set to coincide with the so determined trajectory. The straight edge of the arm 11 of the projector 2 is set to the second index 19 and simultaneously the relevant contour of the map 12 is read off against the index 19. The setting of the slide 15 thus determines the correct positioning of the projector 2 in a horizontal plane.

The elevation of the projector 2 is determined as follows:

The drum 8 is rotated until the division of the scale 9 corresponding to the equi-sight contour read off the map 12 against the index 19 is coinciding with the stationary indicator 10. Since the cyclinder 6 connected to the drum 8 is eccentrically arranged, the rotation thereof causes a raising or lowering of the projector 2.

When the slide 15, the arm 11 and the cylinder 6 are adjusted, the illumination of the projector 2 is started so that the latter throws a spot of light 3 on the landscape target shown on the screen 1, thus indicating the point of impact of the shot fired with the direction and angle of sight as ordered by the observer.

The landscape screen 1 is preferably transparent in order that the observation thereof may be carried out from the side of the screen opposite to that facing the projector 2.

The necessary manipulations can be carried out so rapidly that it is rendered possible to imitate a shooting at the normal rate. Even a rapid fire can be imitated by means of the apparatus according to the present invention.

Figs. 11 and 12 show a practical embodiment of the deviie diagrammatically shown in Fig. 10. A plurality of scales each similar to scale 100 are arranged in a tube 111 which can be rotated about the axis thereof by means of a knob 112 so as to bring the scale corresponding to the employed charge behind a transparent opening 113. A cursor 102 is arranged for motion along the tube 111 and is provided with a mark 104. A thread 105, preferably consisting of rubber, connects the cursor 102 to a mobile assembly 117 including a rod 118 and a frame 119. The mobile assembly 117 is provided with a finger or feeler 106 which normally rests on a cam 108.

As more fully described hereinbefore with reference to Fig. 10, the shape of the cam 108 is designed according to a law corresponding to the law of scattering. The scale from which the desired trajectory is to be read off is placed on a platform 122 and the reading is taken at the intersection of the scale and the thread 105.

The operation of this device is essentially the same as that of the device according to Fig. 10. When the mark 104 of the cursor 102 has been set to the desired division on the scale in the tube 111, the mobile assembly 117 is lifted from the cam 108 and the latter is made to spin by means of the knob 110 clamped on the axle 109, so that the cam 108 is stopped at a random position. Then the finger 106 is brought once more into contact with the cam 108 and the reading is taken at the intersection of the thread 105 with the scale arranged on the platform 122, In order to obtain a greater accuracy, the reading is taken from a graduated ring 125 revolving about an axle 126 and cooperating with a thread 127 kept taut between the axle 126 and the end of a branch member 128 of the mobile assembly 117.

After the various indications given by means of the devices mentioned above have been transmitted to the respective operators and the projector 2 has been set correctly in the vertical and horizontal planes, the projector 2 is illuminated, for instance by pressing a push button (not shown).

As has been described hereinabove, a tube 54 is connected with one end thereof to a ring 53 (Fig. 2). The other end of the tube 54 is attached to a collar 129 (Fig. 13) carrying a frame 130 on which the screen 1 is mounted (See also Fig. 16.)

The screen holding device comprises a tubular bar 131 attached to the collar 129, for instance by carrier members 134, 135 to which are hinged, respectively, cover members 136, 137. The carrier members 134, 135 and the cover members 136, 137 are held together by screws 132, 133, respectively. At the ends of the tubular bar 131 vertical columns 138, 139 are arranged on which two horizontal bars 140 and 141 are slidably arranged. The horizontal bars 140, 141 are connected to the vertical columns 138, 139 by means of screws 142, 143, 144, 145, respectively. The screen 1 is stretched out between the bars 140 and 141 and the part of the columns 138, 139 between the bars. In order to impart more stability to this assembly, a vertical support 147 is connected by a ball joint 146 to the end of the tube 144. Preferably, the support 147 is telescopic and has at its lower end a ball and sock joint 148 connected to sleeve 149 resting on the ground.

If airbursts are to be imitated, an additional device shown in Fig. 14 is used in connection with the slide 15 shown in Fig. 1. An indicating thread 150 is adjustably attached at 151 to the slide 15 and led about a guiding pulley arranged at the pivot point 16 of the slide 15. The free end of the indicating thread 150 is attached to a weight (not shown) in order to keep the thread taut. A carriage 152 moves along guiding members 153 and carries a cam 154 similar to the cam 108 of the device shown in Fig. 10. One end of a small rider 162 cooperates with the cam 154, the other end 156 of the small rider 162 being pivoted to the carriage 152. A rubber thread 157 is secured to the pivot 156 of the carriage 152 and the rider 162 and attached to a cursor 158 which moves along the divisions of a fixed graduated scale 159. The device includes also a scale 160 inclined to the scale 159 and graduated in fuse bore distances. The indication thread 150 is provided with a knot 161 and the rider 162 is designed as a plate bearing a set of hair lines 163, the purpose of which will be more fully described hereinafter.

The procedure to be followed in imitating air bursts with an observation on the line gun-target will be described first.

First the same steps as indicated hereinabove for percussion fire are taken, for instance the slide 15 is set in the given direction. The trajectory is determined as a function of the elevation from the horizontal and of the error in range by means of the device shown in Fig. 10. The index 18 is set on the trajectory 20' determined as above, the arm 11 is set to the mark 19, the equi-sight contour is read against the index or mark 19 and the drum 9 is adjusted accordingly. Then the cursor 158 is set to the division indicating the required correction on the scale 159. The carriage 152 is adjusted so that the thread 157 meet the scale 160 at a division corresponding to the required length of fuse. The knot 161 on the thread 150 is adjusted once and for all in a position representing the horizontal distance from the gun to the point of impact of a percussion shot of the same trajectory. The cam 154 is made to spin freely and stops at a random position whereupon the straight edge 155 of the rider 162 is put into contact with the cam 154. By these means the probable variation of fuse length is introduced. The point of intersection 165 of the straight edge of the rider 162 with the indicating thread 150 gives the horizontal distance between the gun and the vertical projection of the air burst. If this distance is smaller than the distance indicated by the knot 161, the shot actually produces an air burst. If the distance is greater than the distance indicated by the knot 161, the shell strikes the ground before bursting.

The hair lines 163 are designed so that the position of the knot 161 indicates directly the supplementary angle of sight to be given to the projector 2 to allow for the height of an air burst. This supplementary angle is taken into regard by means of the device shown in Fig. 15. The support 4' of the projector 2 rests upon a lever 166 pivoted at one end thereof to a horizontal pivot 159. On the other end the lever 166 carries a pointer 165 which moves along a scale 167. If the pointer 165 is set to the division of the scale 167 corresponding to the hair line 163 indicated by the knot 161, the correction in elevation corresponding to the height of the burst above the horizontal is imparted to the projector 2.

In order to imitate air burst shots with lateral observation, the procedure to be followed is similar to that with an observation on the line gun-target. Instead of setting the guide 11 on the index 19, a scale 164 (Fig. 14) is calibrated in distances from range of impact and range of air burst which can be read from the hair lines 163, and the guide 11 is set on the appropriate division of the scale 167 (Fig. 15). The pointer 165 of the lever 166 is then set to the corresponding division of a scale 167.

In order to represent conveniently all factors as they actually occur in case of air burst shells over ground which cannot be seen from the observation post, such ground is represented by a zone in which points of impact with the ground are out of sight, but which is parallel to the lines of sight of the crest b nearer to the gun platform. The equisight contours of the map and the curves 20' are plotted accordingly. A shot falling into this zone is not observed if it bursts on impact with the ground.

What I claim is:

1. An apparatus for the training of gunners in which an optical projector representing a piece of artillery throws a spot of light on a vertical screen, comprising in combination, a horizontal support for maps of a field of fire in topographical view; a frame rigidly connected to said horizontal support; a projector; bearing means in said frame, said bearing means defining a vertical axis of rotation; a support for said projector connected to said bearing means so as to be rotatable about the vertical axis defined by said bearing means; bearings on said support for said projector, said bearings defining a horizontal axis of rotation for said projector; a set of calibrated slides being in contacting relationship with, and arranged for motion on, the horizontal maps on said horizontal support; means for coupling said slides and said support to turn the latter about the vertical axis defined by said bearing means when said slides move on the maps; and means for turning said projector about the horizontal axis defined by said bearings.

2. An apparatus for the training of gunners in which an optical projector representing a piece of artillery throws a spot of light on a vertical screen, comprising in combination, a horizontal support for maps of a field of fire in topographical view; a frame rigidly connected to said horizontal support; a projector; bearing means in said frame, said bearing means defining a vertical axis of rotation; a support for said projector connected to said bearing means; means for sliding said support vertically with respect to said frame; bearings on said support for said projector, said bearings defining a horizontal axis of rotation for said projector; a set of calibrated slides being in contacting relationship with, and arranged for motion on, the horizontal maps on said horizontal support; means for coupling said slides and said support to turn the latter about the vertical axis defined by said bearing means when said slides move on the maps; and means for turning said projector about the horizontal axis defined by said bearings.

3. An apparatus for the training of gunners in which an optical projector representing a piece of artillery throws a spot of light on a vertical screen, comprising in combination, a horizontal support for maps of a field of fire in topographical view; a frame rigidly connected to said horizontal support; a projector; bearing means in said frame, said bearing means defining a vertical axis of rotation; a support for said projector connected to said bearing means; means for sliding said support vertically with respect to said frame; a member being adjustable in the height thereof and carrying said support; a turnable cam adjusting the height of said member; calibrated means for operating said cam; bearings on said support for said projector, said bearings defining a horizontal axis of rotation for said projector; a set of calibrated slides being in contacting relationship with, and arranged for motion on, the horizontal maps on said horizontal support; means for coupling said slides and said support to turn the latter about the vertical axis defined by said bearing means when said slides move on the maps; and means for turning said projector about the horizontal axis defined by said bearings.

4. An apparatus for the training of gunners in which an optical projector representing a piece of artillery throws a spot of light on a vertical screen, comprising in combination, a horizontal support for maps of a field of fire in topographical view; a frame rigidly connected to said horizontal support; a projector; bearing means in said frame, said bearing means defining a vertical axis of rotation; a support for said projector connected to said bearing means; means for sliding said support vertically with respect to said frame; a member being adjustable in the height thereof and carrying said support; a turnable cam adjusting the height of said member; calibrated means for operating said cam; bearings on said support for said projector, said bearings defining a horizontal axis of rotation for said projector; a set of calibrated slides being in contacting relationship with, and arranged for motion on, the horizontal maps on said horizontal support; means for coupling said slides and said support to turn the latter about the vertical axis defined by said bearing means when said slides move on the maps; a resilient connection forming part of said coupling means; locking means for normally preventing said support from turning said resilient connection being adapted to release said support for turning when said locking means are inoperative; and means for turning said projector about the horizontal axis defined by said bearings.

5. An apparatus for the training of gunners in which an optical projector representing a piece of artillery throws a spot of light on a vertical screen, comprising in combination, a first horizontal support for maps of a field of fire in topographical view; a frame rigidly connected to said first horizontal support; a projector; bearing means in said frame, said bearing means defining a vertical axis of rotation; a support for said projector connected to said bearing means so as to be rotatable about the vertical axis defined by said bearing means; means for sliding said support vertically with respect to said frame; a member being adjustable in the height thereof and carrying said support; a turnable cam adjusting the height of said member; calibrated means for operating said cam; bearings on said support for said projector, said bearings defining a horizontal axis of rotation for said projector; a set of calibrated slides being in contacting relationship with, and arranged for motion on, the horizontal maps on said first horizontal support; means for coupling said slides and said support to turn the latter about the vertical axis defined by said bearing means when said slides move on the maps; a resilient connection forming part of said coupling means; locking means for normally preventing said support from turning, said resilient connection being adapted to release said support for turning when said locking means are inoperative; means for turning said projector about the horizontal axis defined by said bearings; a second horizontal support on said frame; guiding bearings on said frame allowing said second horizontal support to move vertically; a spring; cam means turnably arranged with respect to said spring and adapted to adjust the height of said second horizontal support; and calibrated means for turning said cam means.

6. An apparatus for the training of gunners in which an optical projector representing a piece of artillery throws a spot of light on a vertical screen, comprising in combination, a horizontal support for maps of a field of fire in topographical view; a frame rigidly connected to said horizontal support; a projector; bearing means in said frame, said bearing means defining a vertical axis of rotation; a support for said projector connected to said bearing means so as to be rotatable about the vertical axis defined by said bearing means; bearings on said support for said projector, said bearings defining a horizontal axis of rotation for said projector; means for turning said projector about the horizontal axis defined by said bearings; means connected to said frame for guiding said bearing means while allowing said support to turn and to slide vertically; means for changing the height of said bearing means; a rigid assembly pivoted to said frame so as to be rotatable about the vertical axis defined by said bearing means and arranged so as to lie flat on the horizontal map, said rigid assembly having two parallel grooves; a carriage slidably arranged with respect to said grooves; a rod rigidly connected to said carriage; means for sliding said carriage with respect to said groove; means for coupling said rod and said support for said projector; and means for turning said support about the vertical axis defined by said bearing means when said rigid assembly rotates with respect to said frame.

7. An apparatus for the training of gunners in which an optical projector representing a piece of artillery throws a spot of light on a vertical screen, comprising in combination, a horizontal support for maps of a field of fire in topographical view; a frame rigidly connected to said horizontal support; a projector; bearing means in said frame, said bearing means defining a vertical axis of rotation; a support for said projector connected to said bearing means so as to be rotatable about the vertical axis defined by said bearing means; bearings on said support for said projector, said bearings defining a horizontal axis of rotation for said projector; means for turning said projector about the horizontal axis defined by said bearing; means connected to said frame for guiding said bearing means while allowing said support to turn and to slide vertically; means for changing the height of said bearing means; a rigid assembly pivoted to said frame so as to be rotatable about the vertical axis defined by said bearing means and arranged so as to lie flat on the horizontal map, said rigid assembly having two parallel grooves; slides in said grooves each corresponding to a gun in the battery; a carriage slidably arranged with respect to said grooves and slidably engaging said slides; a rod rigidly connected to said carriage; means for sliding said carriage with respect to said grooves; means for coupling said rod and said support for said projector; and means for turning said support about the vertical axis defined by said bearing means when said rigid assembly rotates with respect to said frame.

8. An apparatus for the training of gunners in which an optical projector representing a piece of artillery throws a spot of light on a vertical screen, comprising in combination, a first horizontal support for maps of a field of fire in topographical view; a frame rigidly connected to said first horizontal support; a second support for a vertical screen connected to said frame; a projector; bearing means in said frame, said bearing means defining a vertical axis of rotation; a third support for said projector, said third support being connected to said bearing means so as to be rotatable about the vertical axis defined by said bearing means; bearings on said third support defining a horizontal axis for allowing said projector to turn about the horizontal axis defined by said bearings; a first calibrated slide moving on the horizontal topographical map and controlling the angular motion of said third support about the vertical axis defined by said bearing means; a vertical spindle rigidly connected with said first calibrated slide; a second calibrated slide operatively connected with said vertical spindle; and means for turning said projector about the horizontal axis defined by said bearings.

GUSTAVE CHARLES AUGUSTE ALRIC.

REFERENCES CITED

The following references are of record in the file of this patent:

UNITED STATES PATENTS

| Number | Name | Date |
|---|---|---|
| 1,546,880 | Baranoff | July 21, 1925 |
| 1,843,237 | McGiffert et al. | Feb. 2, 1932 |
| 1,929,250 | McGiffert et al. | Oct. 3, 1933 |
| 1,995,308 | Kiser | Mar. 26, 1935 |
| 2,063,536 | Baranoff | Dec. 8, 1936 |
| 2,131,952 | House | Oct. 4, 1938 |

FOREIGN PATENTS

| Number | Country | Date |
|---|---|---|
| 839,488 | France | Apr. 4, 1939 |
| 841,995 | France | June 2, 1939 |